US012609471B2

(12) United States Patent
Winterholler et al.

(10) Patent No.: US 12,609,471 B2
(45) Date of Patent: Apr. 21, 2026

(54) MULTILAYERED LATENT-HEAT STORE

(71) Applicant: Rosenberger Hochfrequenztechnik GmbH & Co. KG, Fridolfing (DE)

(72) Inventors: Waldemar Winterholler, Traunreut (DE); Alexander Koleber, Reut (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 357 days.

(21) Appl. No.: 18/580,226

(22) PCT Filed: Jul. 8, 2022

(86) PCT No.: PCT/EP2022/069021
§ 371 (c)(1),
(2) Date: Jan. 18, 2024

(87) PCT Pub. No.: WO2023/001583
PCT Pub. Date: Jan. 26, 2023

(65) Prior Publication Data

US 2024/0332841 A1 Oct. 3, 2024

(30) Foreign Application Priority Data

Jul. 20, 2021 (EP) .................................... 21186662

(51) Int. Cl.
*H01R 13/02* (2006.01)
*H01R 13/533* (2006.01)

(52) U.S. Cl.
CPC ........... *H01R 13/02* (2013.01); *H01R 13/533* (2013.01)

(58) Field of Classification Search
CPC ....... H01R 13/02; H01R 13/533; Y02E 60/14; B60L 53/302; F28D 20/021; F28D 2021/0029
See application file for complete search history.

(56) References Cited

U.S. PATENT DOCUMENTS

| | | | |
|---|---|---|---|
| 10,644,439 | B2 | 5/2020 | Fuehrer et al. |
| 2007/0175609 | A1 | 8/2007 | Christ et al. |

FOREIGN PATENT DOCUMENTS

| | | | |
|---|---|---|---|
| CN | 101074854 | A | 11/2007 |
| DE | 102009040147 | A1 | 3/2011 |
| DE | 102017222243 | A1 | 6/2019 |
| DE | 102018214792 | A1 | 10/2019 |
| DE | 202020002915 | U1 | 9/2020 |
| EP | 3433904 | | 9/2017 |

*Primary Examiner* — Travis S Chambers
(74) *Attorney, Agent, or Firm* — David P. Dickerson

(57) ABSTRACT

Latent-heat store for an electrical conductor for fitting in a housing, with at least two latent-heat storage elements, at least one heat-transporting means, in particular at least two heat-transporting means, which are electrically conductively connected to one another, wherein the latent-heat storage elements and the heat-transporting means are arranged in layers in such a way that the latent heat-storage elements are contacted by the heat-transporting means on at least one surface side in each case, and so heat is conducted from the heat-transporting means into a latent-heat storage element with which it is in contact in such a way that heat can be removed from the electrical conductor into the latent-heat store.

20 Claims, 1 Drawing Sheet

MULTILAYERED LATENT-HEAT STORE

FIELD OF THE INVENTION

The present invention relates to a latent-heat storage device.

TECHNICAL BACKGROUND

EP 3 433904 B1 shows a latent-heat storage device for a HV component.

SUMMARY OF THE DISCLOSURE

Inter alia, the present disclosure discloses a latent-heat storage device having improved heat storage capacity.

Inter alia, the present disclosure teaches:

a latent-heat storage device for an electrical conductor for mounting in a housing, comprising at least two latent-heat storage elements, at least one heat transport means, in particular at least two heat transport means, which are electrically conductively connected to one another, wherein the latent-heat storage elements and the heat transport means are arranged in layers such that the latent-heat storage elements are contacted by the heat transport means on at least one surface side in each case such that heat from the heat transport means is conducted into a contacting latent-heat storage element in such a way that heat can be dissipated from the electrical conductor into the latent-heat storage device.

In sandwich construction, materials with different properties are combined in layers to form a component.

A latent-heat storage device (also known as phase-change memory or PCM) is a heat storage device which stores most of the thermal energy supplied to it in the form of latent heat (for example for a phase change from solid to liquid). The stored heat is concealed because, as long as the phase conversion is not completely finished, the temperature of a substance does not increase any further despite the heat supply. Latent-heat storage devices can therefore store very large amounts of heat in a small temperature range around the phase change. Since many substances with a wide range of different melting points are suitable as phase-change materials, many storage applications from cold-temperature to high-temperature heat storage devices can be covered by this technology.

Latent heat is thermal energy which is stored in a material by means of a (partial) phase change.

A latent-heat storage element contains a phase-change material. Provision may be made for further material components to be added to the phase-change material in order to ensure other properties of the latent-heat storage element. An example of a suitable phase-change material is paraffin. In order to prevent the latent-heat storage element from losing its strength during operation and/or to improve the thermal conductivity of the phase-change material, it is possible to add graphite, for example, to the phase-change material. At an appropriate mixing ratio, the latent-heat storage element does not liquefy, but instead becomes gelled. In addition, graphite in paraffin improves the transport of heat in a phase-change material with a graphite-paraffin mixture.

A gel is a dispersed system consisting of at least two components. The solid component here forms a sponge-like, three-dimensional network whose pores are filled by a liquid or a gas. The liquid component is thus immobilized in the solid component.

Inter alia, the present disclosure teaches layering at least two latent-heat storage elements on top of each other in a sandwich-like manner, wherein the latent-heat storage elements each make contact with a heat transport means, which dissipates heat from an electrical conductor. Provision may also be made for the latent-heat storage elements to make contact with an identical heat transport means when the heat transport means is arranged between two latent-heat storage elements and is electrically connected to an electrical conductor from which heat is to be dissipated.

As an alternative, at least two heat transport means can also be provided. In this case, a first heat transport means is electrically connected to a heat-conducting electrical conductor. The second heat transport means is electrically conductively connected to the first heat transport means and is thus indirectly connected to the heat-conducting electrical conductor. As a result, the heat is dissipated from the heat-conducting electrical conductor into the heat transport means. The heat transport means in turn dissipate the heat into the latent-heat storage elements which are in contact.

Accordingly, the thermal energy from the heat transport means is stored in the latent-heat storage element in the form of energy for a phase change, for example melting energy.

The thermal capacity of a latent-heat storage element can therefore be approximately doubled if the latent-heat storage device has two latent-heat storage elements.

The latent-heat storage elements may accordingly be arranged between a plurality of heat transport means or alternatively a heat transport means may be arranged between two latent-heat storage elements.

Various alternatives of a latent-heat storage element are conceivable, including that the heat transport means is arranged between two latent-heat storage elements and is designed to be connected to an electrical conductor, the heat of which is to be dissipated by means of the latent-heat storage device, or that two latent-heat storage elements are arranged between two heat transport means, wherein the two heat transport means are designed to be electrically connected to an electrical conductor, the heat of which is to be dissipated by means of the latent-heat storage device.

Since the gelled state of the latent-heat storage element cannot be achieved beyond an arbitrary height (during desired operating times), an increase in the heat storage capacity can be ensured primarily by an increase in the surface of a latent-heat storage element which makes contact with a heat transport means.

Any fixed casing which delimits the latent-heat storage device at its operating temperature is suitable for use as a housing. The latent-heat storage device may accordingly be inserted into a housing of a higher-level component, the latent-heat storage device may be enclosed by a separate housing or be overmolded by a suitable material with sufficient heat resistance and strength.

Advantageous configurations and developments result from the further dependent claims and from the description with reference to the figures of the drawing.

In some embodiments, the latent-heat storage device has two heat transport means, wherein the two latent-heat storage elements are arranged between the two heat transport means.

This results in the following layer structure: heat transport means-latent-heat storage element-latent-heat storage element-heat transport means.

In this configuration, it is advantageous if the first heat transport means forms an input interface to a heat-conducting electrical conductor and the second heat transport means has an output interface to the heat-conducting electrical conductor, for example contact pins.

Accordingly, the heat-conducting electrical conductor is interrupted or bridged by the latent-heat storage device and has at least two components, namely one section which extends to the input interface and another section which leads away from the output interface.

Although the electrical conductor may have several sections or components, for example busbars and contact pins, the present disclosure still refers to an electrical conductor.

As an alternative, it is also conceivable that the second heat transport means is arranged between the latent-heat storage elements. In this case, the following structure results: heat transport means-latent-heat storage element-heat transport means-latent-heat storage element.

In this case, the heat transport means, which is arranged between the latent-heat storage elements, can otherwise be electrically connected to the heat-conducting electrical conductor.

In some embodiments, the latent-heat storage device comprises a compressible layer which is designed to fix the layers in a housing and/or between heat transport means, wherein the compressible layer is compressed due to a thermal expansion of the latent-heat storage elements as the temperature of the latent-heat storage elements increases and expands due to its elasticity as the temperature of the latent-heat storage elements decreases.

Accordingly, the compressible layer is dimensioned such that the latent-heat storage elements are pressed from the compressible layer onto the heat transport means at a temperature lower than the operating temperature of the latent-heat storage device. If the latent-heat storage elements expand during the operation of the latent-heat storage device, the compressible layer is compressed due to the thermal expansion of the latent-heat storage elements.

The latent-heat storage elements are therefore secured against slipping within the housing even at temperatures below the operating temperature of the latent-heat storage device. In addition, the compressible layer also dampens vibrations due to its elasticity.

In some embodiments, the heat transport means comprises a metal-containing heat transport means, for example a metallic heat transport means. The heat transport means may be formed as a metallic plate, as a metallic vapor deposition or as another metallic component. It is conceivable that the metal-containing heat transport means is formed over the entire surface, not over the entire surface with a certain contour, flat and/or curved to at least one surface of the latent-heat storage element.

It is conceivable that the surface of the metallic plate corresponds to a surface of the latent-heat storage element.

It is understood that, as an alternative, provision can also be made for the heat to be introduced in the latent-heat storage element not in a planar manner, but locally or selectively. In a planar manner means that, in a cuboid latent-heat storage element, the heat is introduced over the entire surface of one side of the latent-heat storage element.

In this case, it is also expedient if the heat transport means has a thermally conductive layer which is applied to the metallic heat transport means and which is designed to fill air inclusions. The thermally conductive layer may be formed, for example, as a flexible or curing paste, for example silicone paste, which may have added components.

A thermally conductive layer is understood to be a material which has a better thermal conductivity than air, the main function of which is the transfer of heat between substances or components and which is applied, in particular, over the entire surface of the latent-heat storage element or the metallic heat transport means.

In some embodiments, the heat transport means are electrically connected and supported against each other by means of at least one electrically conductive support. The support accordingly ensures the transfer of heat and electricity between the heat transport means and ensures or improves its mechanical stability. The mechanical stability of the two heat transport means can be ensured, in particular, by connecting the heat transport means by means of three supports. It is understood that three electrically conductive supports are advantageous in terms of thermal conductivity and electrical conductivity, but mechanical stability can also be established by means of an electrically conductive support and two other non-conductive supports.

In some embodiments, at least two heat transport means of the latent-heat storage device are designed to be connected to an electrical conductor, the heat of which is to be dissipated from the latent-heat storage device.

Accordingly, provision can be made for the heat transport means to have recesses, for example bores, to receive electrical conductors with heat to be dissipated. This ensures a particularly effective dissipation of heat through the heat transport means.

In some embodiments, a latent-heat storage device comprises several pairs of latent-heat storage elements which are each arranged between two heat transport means.

Provision may also be made here for further latent-heat storage elements to be formed between a housing and a heat transport means.

In some embodiments, the latent-heat storage elements comprise at least two material components, the proportions of which are adjusted such that the latent-heat storage elements are in a gelled state at an operating temperature.

It is understood that a connector, in particular a charging socket, having at least one electrical conductor which can be connected to a latent-heat storage device as claimed in any one of the preceding claims in such a way that heat is dissipated from the electrical conductor to the latent-heat storage device, wherein an input and/or an output interface is designed as a press and/or screw connection between the electrical conductor connected at an interface and each of the heat transport means, is advantageous.

It is understood that an electrical conductor, in particular a busbar or electrical contact element, having a latent-heat storage device as has been described above, wherein heat can be dissipated from the electrical conductor to the latent-heat storage device and can be stored in the latent-heat storage device, in particular as latent heat, is advantageous.

A busbar is a supply line made of rigid, electrically conductive material for transporting electrical energy.

The present disclosure describes, in particular, an electrical conductor for the transport of electrical energy between two components and which is connected or can be connected to a latent-heat storage device. This means that heat, which decreases in the electrical conductor due to high currents or high voltages, can be dissipated into the latent-heat storage device. It can thus be ensured that a permissible operating temperature of an electrical conductor is not exceeded, since heat can be stored as latent heat in the latent-heat storage device. In particular, provision may be made for the latent-heat storage device and the electrical conductor to form different components.

It is understood that a kit for mounting a latent-heat storage device as has been described above, having a housing for accommodating a predetermined number of pairs of latent-heat storage elements of the corresponding number of pairs of latent-heat storage elements and a corresponding number of transport means such that so many heat transport means are present that a pair of latent-heat storage elements can be arranged between two heat transport means, is advantageous.

Accordingly, provision can be made for each latent-heat storage element to be associated with a heat transport means or advantageously that the number of heat transport means results from the formula $$\frac{\text{Number of latent heat storage elements}}{2}+1$$

Accordingly, the kit for a described latent-heat storage device can be dimensioned for any number of latent-heat storage elements. This means that the heat storage capacity of a latent-heat storage device can be adjusted almost as desired when installation space is available.

It goes without saying that the features mentioned above and those to be explained below can be used not only in the respectively specified combination but also in other combinations or alone, without departing from the scope of protection of the present invention.

The above configurations and developments can be combined with one another as desired, provided this makes sense. Further possible configurations, developments and implementations of the invention also comprise not explicitly mentioned combinations of features of the invention described above or in the following text with respect to the exemplary embodiments. In particular, a person skilled in the art will also add individual aspects here as improvements or additions to the basic form of the present invention.

INDICATION OF CONTENTS OF THE DRAWING

The present invention is explained in more detail below with reference to the exemplary embodiments specified in the schematic figures of the drawing. In this case:

Figure 1:
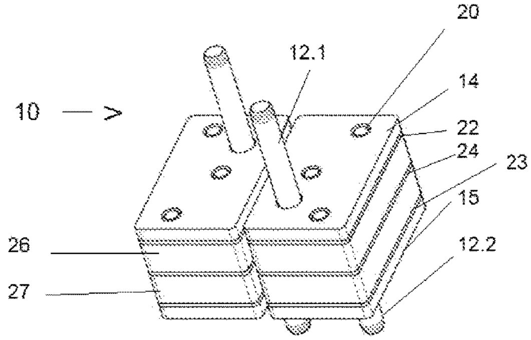
FIG. 1 shows a perspective view of one embodiment in accordance with the present disclosure.

The appended figures of the drawing are intended to impart a further understanding of the embodiments of the invention. Said figures illustrate embodiments and serve to explain principles and concepts of the invention in connection with the description. Other embodiments and many of the mentioned advantages result with respect to the drawings. The elements of the drawings are not necessarily shown in a manner true to scale with respect to one another.

In the figures of the drawing, identical, functionally identical and identically acting elements, features and components—unless otherwise stated—are each provided with the same reference signs. In the following text, the figures are described coherently and comprehensively.

DESCRIPTION OF EXEMPLARY EMBODIMENTS

FIG. 1 shows a schematic perspective view of a pair of latent-heat storage devices 10. For the sake of simplicity, reference signs are simply indicated in the drawings on one side of a conductor of the conductor pair 12.

The latent-heat storage device 10 is connected to several sections 12.1, 12.2, 12.3, 12.4 of conductors of a pair of conductors 12. The pair of conductors 12 comprises a first conductor with sections 12.1 and 12.2 and a second conductor which also has two sections. The latent-heat storage device 10 is of identical design for the two conductors of the conductor pair 12.

The first section 12.1 of the electrical conductor is connected by means of a press connection to a heat transport means which is formed as a metal plate 14. Electrical current and heat is therefore transferred from the first section of the conductor 12.1 to the metal plate 14. The interface, that is to say the press connection, between the first section 12.1 of the electrical conductor and the metal plate 14 forms an input interface. The metal plate 14 has four bores, one of which is occupied by a bore of the first section 12.1 of the electrical conductor. The three remaining bores are occupied by supports 34, 35, 36 (not shown in FIG. 1) in that the supports extend between the metal plate 14 and the metal plate 15.

A thermally conductive paste 22, which fills air inclusions between the metal plate 14 and the latent-heat storage element 26, is applied to the underside of the metal plate 14, that is to say the side facing the latent-heat storage element. The thermally conductive paste 22 is more thermally conductive than air, with the result that the paste 22 ensures an improvement with regard to the thermal conductivity between the metal plate 14 and the latent-heat storage element 26. Another latent-heat storage element 27 is arranged between the two metal plates 14 and 15. Between the latent-heat storage elements 26 and 27, there is arranged a compressible layer 24 which presses the latent-heat storage elements 26 and 27 against the metal plates 14 and 15 and in particular against a housing 18 (not shown in FIG. 1). If the components of the latent-heat storage device 10 expand due to thermal expansion, the compressible layer 24 is compressed accordingly. Another layer of thermally conductive paste 23 is applied between the metal plate 15 and the latent-heat storage element 27.

Figure 2:
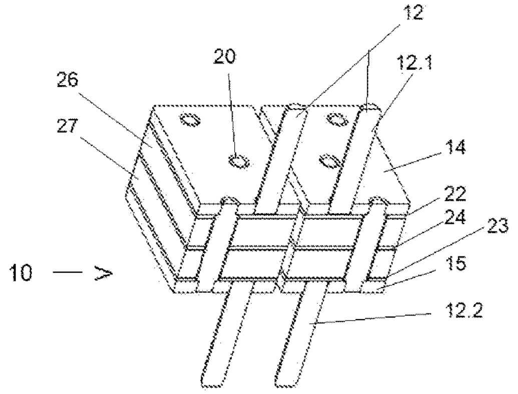
FIG. 2 shows a sectional illustration of a schematic perspective view according to one embodiment in accordance with the present disclosure.

FIG. 2 shows a perspective sectional view of a pair of latent-heat storage devices 10 similar to FIG. 1. FIG. 2 also illustrates the support 36 which extends between the metal plates 14 and 15. The support 36 is connected to the metal plates 14 and 15 via a press connection in each case.

Figure 3:
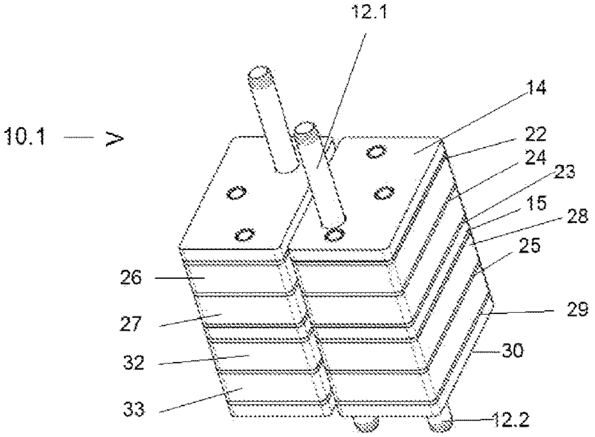
FIG. 3 shows a schematic perspective view according to one embodiment in accordance with the present disclosure.

FIG. 3 shows another schematic perspective view of a pair of latent-heat storage devices 10.1. The latent-heat storage device 10.1 comprises four latent-heat storage elements 26, 27, 32, 33 for each electrical conductor of the conductor pair 12. The latent-heat storage device according to FIG. 3 accordingly has eight latent-heat storage elements.

From the formula (Number of latent-heat storage elements)/2+1, it follows that the latent-heat storage device 10.1 has three metal plates 14, 15, 30.

For the purpose of better illustration, the housing 18 in the latent-heat storage devices 10 and 10.1 according to FIGS. 1-3 is hidden.

Figure 4:
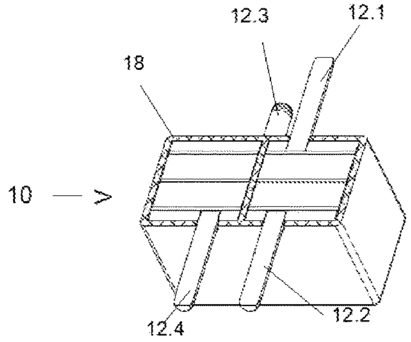
FIG. 4 shows a schematic perspective view of one embodiment in accordance with the present disclosure.

FIG. 4 shows a sectional illustration of a perspective view of a latent-heat storage device 10 according to FIG. 1. FIG.

4 also illustrates a housing 18 which encloses the components of the latent-heat storage device. It is clear from FIG. 4 that the sections 12.1, 12.2, 12.3 and 12.4 of the electrical conductors do not have to pass through a common plane. The sections 12.1 and 12.3 of the input interface can occupy one of several bores in the metal plates 14 according to the application. Accordingly, the sections 12.2 and 12.4 of the output interface can occupy any bore of the metal plates 15, that is to say the sections of the electrical conductor of the input and/or output interface do not necessarily have to be inserted in opposite bores.

Figure 5:
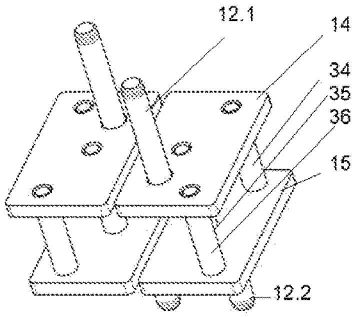
FIG. 5 shows a schematic perspective view of components according to one embodiment in accordance with the present disclosure.

FIG. 5 shows a perspective view of several components of a latent-heat storage device. FIG. 5 shows only the sections of the electrical conductors 12.1 and 12.2, the metal plates 14 and 15 and three supports 34, 35, 36. In order to illustrate the supports 34-36 between the metal plates 14 and 15, the latent-heat storage elements 26, 27 are not shown in FIG. 5.

Figure 6:
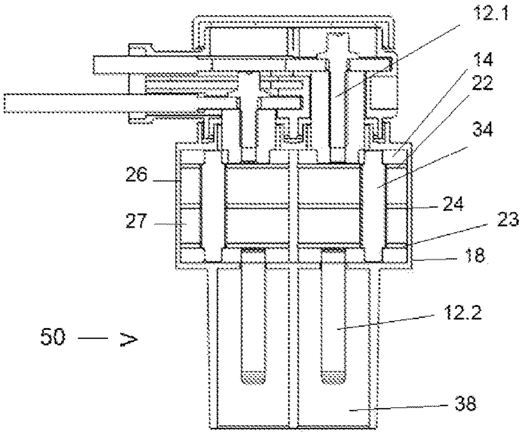
FIG. 6 shows a schematic sectional view of an electrical component according to one embodiment in accordance with the present disclosure.

FIG. 6 shows an electronic component 50 having a latent-heat storage device 10 as has been described above. The electronic component 50 comprises a pair of conductors 12 having a conductor having a first section 12.1 to an input interface of the latent-heat storage device 10 and a second section 12.2 forming an output interface to the latent-heat storage device 10. The first section of the electrical conductor is designed as a busbar. The second section 12.2 of the electrical conductor is designed as a pair of male connector contact pins 38. The male connector 38 forms what is known as a charging socket, which can be connected to a female connector in order to charge a battery.

Although the present invention has been described completely above on the basis of exemplary embodiments, it is not restricted thereto, but rather may be modified in diverse ways.

LIST OF REFERENCE SIGNS

10 Latent-heat storage device
10.1 Latent-heat storage device
12 Conductor pair
12.1 First section
12.2 Second section
14 Metal plate
15 Metal plate
18 Housing
20 Bore
22 Thermally conductive paste
23 Thermally conductive paste
24 Compressible layer
26 Latent-heat storage element
27 Latent-heat storage element
28 Thermally conductive paste
29 Thermally conductive paste
30 Metal plate
32 Latent-heat storage element
33 Latent-heat storage element
34 Support
35 Support
36 Support
38 Connector
50 Electrical component

The invention claimed is:

1. A plug connector, comprising:
a first contact element;
a first metal plate in thermal communication with said first contact element;
a second metal plate in thermal communication with said first contact element;
a first phase-change heat storage element; and
a second phase-change heat storage element, wherein
substantially an entirety of a first major surface of said first metal plate thermally contacts said first phase-change heat storage element,
substantially an entirety of a second major surface of said second metal plate thermally contacts said second phase-change heat storage element,
said first major surface is substantially orthogonal to a first longitudinal axis of said first contact element, and
said second major surface is substantially orthogonal to said first longitudinal axis.

2. The plug connector of claim 1, comprising:
a housing; and
a first layer of elastically compressible material abuttingly situated between said first phase-change heat storage element and a component selected from the group consisting of said second phase-change heat storage element and said housing.

3. The plug connector of claim 1, comprising:
a first layer of thermally conductive paste; and
a second layer of thermally conductive paste, wherein
said first major surface thermally contacts said first phase-change heat storage element via said first layer of thermally conductive paste, and
said second major surface thermally contacts said second phase-change heat storage element via said second layer of thermally conductive paste.

4. The plug connector of claim 1, wherein:
at least one of said first phase-change heat storage element and said second phase-change heat storage element comprises a mixture of a phase-change material and graphite.

5. The plug connector of claim 1, comprising:
a plurality of supports that mechanically stabilize said first metal plate and said second metal plate, wherein
at least one of said plurality of supports is electrically conductive and electrically interconnects said first metal plate and said second metal plate.

6. The plug connector of claim 1, comprising:
a third phase-change heat storage element, wherein
substantially an entirety of a third major surface of said second metal plate thermally contacts said third phase-change heat storage element.

7. The plug connector of claim 6, comprising:
a third metal plate in thermal communication with said first contact element; and
a fourth phase-change heat storage element, wherein
substantially an entirety of a fourth major surface of said third metal plate thermally contacts said fourth phase-change heat storage element,
said fourth major surface is substantially orthogonal to said first longitudinal axis.

8. The plug connector of claim 7, comprising:
a plurality of supports that mechanically stabilize said first metal plate, said second metal plate, and said third metal plate, wherein
at least one of said plurality of supports is electrically conductive and electrically interconnects said first metal plate, said second metal plate, and said third metal plate.

9. The plug connector of claim 1, wherein:
an area of said first major surface is many times larger than a cross-sectional area of said first contact element, and
an area of said second major surface is many times larger than a cross-sectional area of said first contact element.

10. The plug connector of claim 1, comprising:

a second contact element, a fifth metal plate in thermal communication with said second contact element, a sixth metal plate in thermal communication with said second contact element, a fifth phase-change heat storage element, and a sixth phase-change heat storage element, wherein said second contact element, said fifth metal plate, and said sixth metal plate are collectively electrically insulated from said first contact element, said first metal plate, and said second metal plate, a second longitudinal axis of said second contact element is substantially parallel to said first longitudinal axis, substantially an entirety of a fifth major surface of said fifth metal plate thermally contacts said fifth phase-change heat storage element, substantially an entirety of a sixth major surface of said sixth metal plate thermally contacts said sixth phase-change heat storage element, said fifth major surface is substantially orthogonal to said second longitudinal axis, and said sixth major surface is substantially orthogonal to said second longitudinal axis.

11. An assembly, comprising:

a first electrical conductor;

a first metal plate in thermal communication with said first electrical conductor;

a second metal plate in thermal communication with said first electrical conductor;

a first phase-change heat storage element;

a second phase-change heat storage element; and a first plurality of supports that mechanically stabilize said first metal plate and said second metal plate, wherein substantially an entirety of a first major surface of said first metal plate thermally contacts said first phase-change heat storage element, substantially an entirety of a second major surface of said second metal plate thermally contacts said second phase-change heat storage element, at least one of said first plurality of supports is electrically conductive and electrically interconnects said first metal plate and said second metal plate, and said at least one electrically conductive support is substantially orthogonal to said first metal plate and said second metal plate.

12. The assembly of claim 11, comprising:

a first layer of elastically compressible material abuttingly situated between said first phase-change heat storage element and a component selected from the group consisting of said second phase-change heat storage element and a housing.

13. The assembly of claim 11, comprising:

a first layer of thermally conductive paste; and a second layer of thermally conductive paste, wherein said first major surface thermally contacts said first phase-change heat storage element via said first layer of thermally conductive paste, and said second major surface thermally contacts said second phase-change heat storage element via said second layer of thermally conductive paste.

14. The assembly of claim 11, wherein:

at least one of said first phase-change heat storage element and said second phase-change heat storage element comprises a mixture of a phase-change material and graphite.

15. The assembly of claim 11, wherein:

a major portion of said first electrical conductor is situated outside a volume between said first metal plate and said second metal plate.

16. The assembly of claim 11, comprising: a third phase-change heal storage element, wherein substantially an entirety of a third major surface of said second metal plate thermally contacts said third phase-change heat storage element.

17. The assembly of claim 11, comprising:

a third metal plate in thermal communication with said first electrical conductor; and a fourth phase-change heat storage element, wherein substantially an entirety of a fourth major surface of said third metal plate thermally contacts said fourth phase-change heat storage element, said at least one electrically conductive support is substantially orthogonal to said third metal plate.

18. The assembly of claim 11, wherein:

an area of said first major surface is many times larger than a cross-sectional area of first electrical conductor, and an area of said second major surface is many times larger than a cross-sectional area of first electrical conductor.

19. The assembly of claim 11, comprising:

a second electrical conductor;

a fifth metal plate in thermal communication with said second electrical conductor;

a sixth metal plate in thermal communication with said second electrical conductor;

a fifth phase-change heat storage element; and a sixth phase-change heat storage element;

a second plurality of supports that mechanically stabilize said fifth metal plate and said sixth metal plate, wherein said second electrical conductor, said fifth metal plate, and said sixth metal plate are collectively electrically insulated from said first electrical conductor, said first metal plate, and said second metal plate, substantially an entirety of a fifth major surface of said fifth metal plate thermally contacts said fifth phase-change heat storage element, substantially an entirety of a sixth major surface of said sixth metal plate thermally contacts said sixth phase-change heat storage element, at least one of said second plurality of supports is electrically conductive, electrically interconnects said fifth metal plate and said sixth metal plate, and is substantially orthogonal to said first metal plate and said second metal plate.

20. The assembly of claim 19, comprising:

a housing that forms at least part of a mechanical interface of a plug connector, wherein said first electrical conductor electrically and mechanically contacts said first metal plate, said second electrical conductor electrically and mechanically contacts said fifth metal plate, said first electrical conductor is affixed to said housing and constitutes a first contact element of an electrical interface of said plug connector, and said second electrical conductor is affixed to said housing and constitutes a second contact element of said electrical interface of said plug connector.

* * * * *